United States Patent [19]

Hayashi et al.

[11] Patent Number: 4,774,607
[45] Date of Patent: Sep. 27, 1988

[54] EJECT LEVER ARRANGEMENT

[75] Inventors: Hideki Hayashi; Hideyo Ishikawa, both of Tokyo, Japan

[73] Assignee: Clarion Co., Ltd., Tokyo, Japan

[21] Appl. No.: 913,816

[22] Filed: Sep. 30, 1986

[30] Foreign Application Priority Data

Oct. 2, 1985 [JP] Japan ................... 60-218119

[51] Int. Cl.$^4$ ............................................. G11B 15/00
[52] U.S. Cl. ..................................................... 360/96.5
[58] Field of Search .............................. 360/96.5, 96.6; 242/197-200

[56] References Cited

U.S. PATENT DOCUMENTS 3,867,721  2/1975  Saunders .
4,510,540  4/1985  Kato .
4,586,096  4/1986  Okada .
4,628,381  12/1986  Takai .
4,633,348  12/1986  Takai .
4,672,478  6/1987  Takai ................... 360/96.5

FOREIGN PATENT DOCUMENTS 57-20951  2/1982  Japan .

Primary Examiner—A. J. Heinz
Attorney, Agent, or Firm—Flynn, Thiel, Boutell & Tanis

[57] ABSTRACT

An eject lever arrangement includes a subsidiary plate mounted on an eject lever by engagement between an engage pin of the eject lever and an engage hole of the subsidiary plate for reciprocal and swinging movements. The subsidiary plate is connected to a guide arm by a link member so that the guide arm is rotated by the eject lever and subsidiary plate to move a pack stopper back and forth to eject a cassette out of the tape player or pull same to an inner position of the tape player.

4 Claims, 4 Drawing Sheets

EJECT LEVER ARRANGEMENT

FIELD OF THE INVENTION

This invention relates to an ejection lever arrangement for removal of a tape cassette from its reproducing position of a cassette-type tape player.

BACKGROUND OF THE INVENTION

Some prior art ejection lever arrangements for a tape player are configured to eject a tape cassette by simultaneously compressing fast-forwarding and rewinding levers or by compressing an independently provided ejection lever. In both cases, levers take their uniform positions projecting from the front outer margin of the tape player regardless of whether a tape cassette is present or absent in the tape player. The projecting lever often causes inconvenience in insertion of a tape cassette or in display of the tape player in shops. Also, projecting levers are often caught or hit by some external things which probably damage the lever.

Further, the uniform position of the lever before and after insertion of a tape cassette does not indicate whether any cassette is present in the tape player, and a user cannot acknowledge presence or absence of a cassette in the tape player unless he looks into the interior of the tape player. This is very inconvenient particularly in use in a car.

It is therefore desired that the lever projects forwardly merely in presence of a cassette in the tape player but retires to an inner position in absence of a cassette.

Most of tape players have a pack stopper supporting the cassette, a guide arm and an inversion spring interposed between the two former members, so when that the guide arm is rotated rearwardly from its forward position, the inversion spring stores an energy and subsequently pulls a cassette inwardly by its inverting action. The guide arm is comovably connected to an eject lever via an eject plate. Therefore, if the eject lever and eject plate are held in their rearward positions, the guide arm also stops at its rearward position and cannot eject a cassette. From this viewpoint, it is necessary to return the guide arm to its forward position capable of ejecting a cassette, while holding the eject lever and eject plate stationary at their rearward positions. In this case, the use of a long inversion spring will permit the guide arm to return to its forward position, but will prevent a subsequent suction of a cassette. Therefore, this method cannot be employed.

From these reasons, it has been difficult to hold the eject plate and eject lever at their rearward positions in absence of a cassette in the tape player.

One might propose to reduce the projecting amount of the lever in absence of a cassette. However, this invites a new problem that misoperations will increase during ejection of a cassette due to a decreased insertion stroke of the lever.

OBJECT OF THE INVENTION

It is therefore an object of the invention to provide an eject lever arrangement where the guide arm can be returned to its forward position ready for suction of a tape cassette upon ejection of a cassette, while holding the eject lever and eject plate stationary, so that the eject lever takes a forward position in presence of a tape cassette in the tape player and takes a rearward position in absence of a tape cassette.

SUMMARY OF THE INVENTION

According to the invention, there is provided an eject lever arrangement in a tape player comprising:
an eject lever reciprocated by an ejecting operation;
a subsidiary plate having an engage means engageable with an engage means of said eject lever and reciprocally and swingingly movable with respect to said eject lever;
a pack stopper supporting a cassette inserted in the tape player;
a pivotable guide arm;
an inversion spring interposed between said pack stopper and said guide arm;
a link member conjoining said subsidiary plate and said guide arm; and
a lock member locking said eject lever inserted in an inner position of the tape player by an ejecting operation and unlocking same upon insertion of a cassette.

This arrangement makes it possible to return the guide arm to its forward position for cassette suction after ejection of a cassette by moving the subsidiary plate forwardly, while maintaining the eject lever and eject plate stationary at their rearward positions.

BRIEF DESCRIPTION OF THE DRAWINGS

FIGS. 1 through 4 are plan views of major components of an eject lever arrangement embodying the invention in which:

FIG. 1 shows a configuration in absence of a tape cassette in the tape player;

FIG. 2 shows a configuration during an ejecting operation;

FIG. 3 shows a configuration immediately before completion of the ejecting operation; and FIG. 4 shows a configuration upon completion of the ejecting operation.

DETAILED DESCRIPTION

Figure 1:
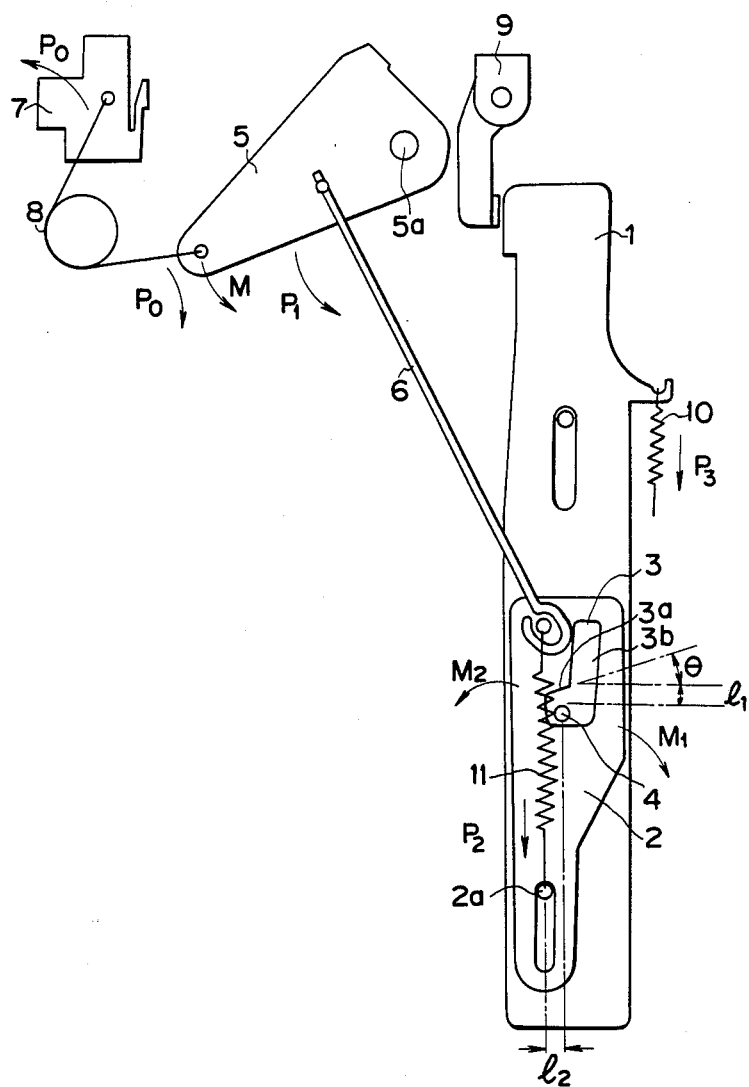

The invention is hereinbelow described in detail, referring to a preferred embodiment illustrated in the drawings as applied to a known ejection mechanism of a tape player.

In FIG. 1, a subsidiary plate 2 is mounted on an eject lever 1. The subsidiary plate 2 has an engage hole 3 including a tapered engage portion 3a and an elongated relief portion 3b to receive an engage pin 4 of the eject lever 1. A clearance 11 is provided between the engage pin 4 and engage portion 3a, i.e. between the ejection lever 1 and subsidiary plate 2. The subsidiary plate 2 (can move with respect to the eject lever 1 in the length direction before the engage pin 4 engages a margin of the engage hole 3, but moves together with the eject plate 1 thereafter. A rod-shaped link 6 is interposed between the subsidiary plate 2 and a guide arm 5 to transmit to the subsidiary plate 2 the energy of an inversion spring 8 provided between a pack stopper 7 and the guide arm 5. When a tape pack is inserted in the tape player, it engages the pack stopper 7 and moves it upwardly in the drawings from the lower or forward position shown in FIG. 4 to the upper or rearward position shown in FIG. 1. The subsidiary plate 2 is reciprocally movable relative to a guide pin 2a provided on a base plate of the tape player, and can swing about the guide pin 2a. A lock member 9 is provided at a rear end position (upper position in FIG. 1) to lock the eject lever 1 after cassette ejection, and unlock same upon tape cassette insertion. The eject lever 1 and subsidiary plate 2 are biased forwardly by revival springs 10 and 11 respectively.

The inversion spring 8 has a spring energy PO which applies a counterclockwise (in the drawings) moment M to the guide arm 5. The moment M produces a rotational force P1 which applies a clockwise moment M1 to the subsidiary plate 2. When the eject lever 1 is pushed forwardly, the engage pin 4 urges the engage portion 3a of the subsidiary plate 2 to apply a counterclockwise moment M2 to the plate 2. The moments M1 and M2 applied to the subsidiary plate 2 has a relationship of M2<M1. The counterclockwise moment M2 may be adjusted within a range smaller than the clockwise moment M1 by appropriately selecting a revival force P2 of the revival spring 11, the inter-axes distance l2 (transversal distance in FIG. 1) from the axle 2a of the subsidiary plate 2 to the engage pin 4 of the eject lever 1, and the sloping angle $\theta$ of the engage portion 3a. The ejection lever 1 is biased by a revival spring 10 having a revival force P3.

With this arrangement, the eject lever arrangement operates as follows.

In FIG. 1 illustrating a configuration for the play mode of the tape player, the eject lever 1 and subsidiary plate 2 take their forward (not inserted) positions (upper positions in FIG. 1), whereas the pack stopper 7 takes its rearward position (lower position in FIG. 1). Therefore, one pivotal point of the inversion spring 8 on the pack stopper 7 is located rearward of the other pivotal point on the guide arm 5. Due to this, the spring energy PO of the inversion spring 8 causes the rotational force P1 of the guide arm 5 to apply the clockwise moment M1 to the subsidiary plate 2 via the link 6. As the result, the subsidiary plate 2 is rotated clockwisely to accept the engage pin 4 of the eject lever 1 in the engage portion 3a of the engage hole 3.

When the eject lever 1 is pushed rearwardly against the revival spring 10 from the position of FIG. 1, it initially moves alone by an amount corresponding to the clearance l1 before contacting the angled margin of the engage portion 3a of the engage hole 3, and thereafter urges the sloped margin 3a to apply the counterclockwise moment M2 to the subsidiary plate 2. Since the counterclockwise moment M2 is smaller than the clockwise moment M1 supplied from the inversion spring 8 as described above, the subsidiary plate 2 engages the eject lever 1 via the engage portion 3a, and subsequently moves rearwardly together with the eject lever 1 with a further rearward movement of the lever 1.

Along with the unitary insertion of the eject lever 1 and subsidiary plate 2, the guide arm 5 is urged via the link 6 and rotated clockwisely about the axle 5a, so as to contract the inversion spring 8 and move the pivotal point on the guide arm 5 rearwardly. When both ends of the inversion spring 8 and the axle 5a of the guide arm 5 align in a single straight line (FIG. 2), the spring energy PO is oriented to the axle of the guide arm 5 and does not apply a rotational force to the guide arm. Therefore, the clockwise moment M1 heretofore applied to the subsidiary plate 2 becomes substantially zero. On the other hand, the spring energy PO causes a rotational resistance MS in the guide arm. The rotational resistance MS is transmitted to the subsidiary plate 2 via the link 6 as a clockwise moment to establish a new relation of MS<M2. Due to this, the subsidiary plate 2 is maintained at the clockwisely rotated position so as to receive the engage pin 4 of the eject lever 1 in the engage portion 3a of the engage hole 3.

Figure 2:
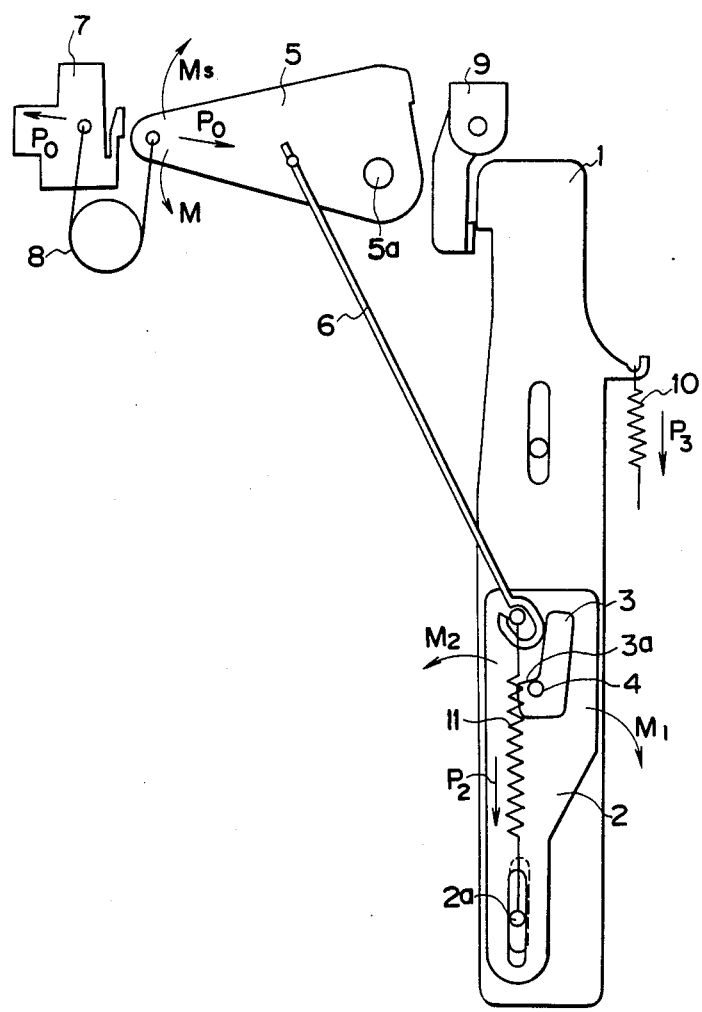
Figure 3:
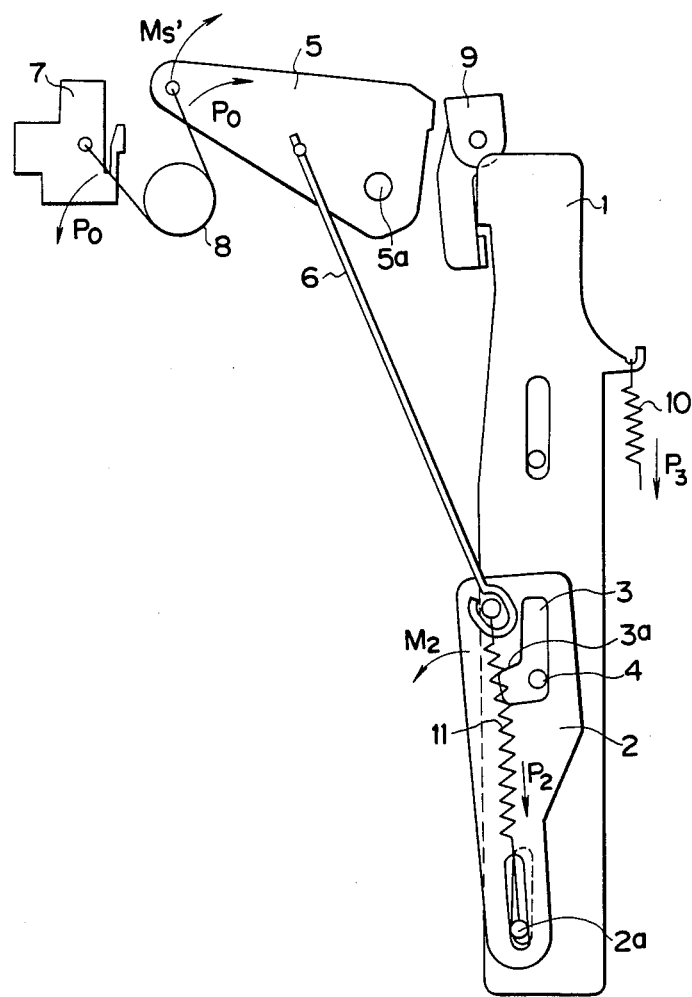

When the eject lever 1 is further pushed from the position of FIG. 2, the pivotal point of the inversion spring 8 on the guide arm 5 is moved rearward of the pivotal point on the pack stopper 7 (this is an inverting action of the inversion spring 8), so that the spring energy PO applies a clockwise moment MS' (FIG. 3) to the guide arm 5. The moment MS' is applied as a counterclockwise moment to the subsidiary plate 2 via the link 6, so that the subsidiary plate 2 receives the counterclockwise moment M2+MS' and rotates counterclockwise. Due to this, as shown in FIG. 3, the engage pin 4 moves to the relief portion of the engage hole 3 to disengage the subsidiary plate 2 from the eject lever 1 and allow the plate 2 to return to its forward position alone with the energy of the revival spring 11. Since the inversion spring 8 urges the pack stopper 7 forwardly after its inversion, the pack stopper 7 and guide arm 5 return to their forward positions with the spring energy PO, bringing the subsidiary plate 2 via the link 6. The inserted eject lever 1 is locked at its rearward position by the lock member 9. The resulting configuration is shown in FIG. 4.

Figure 4:
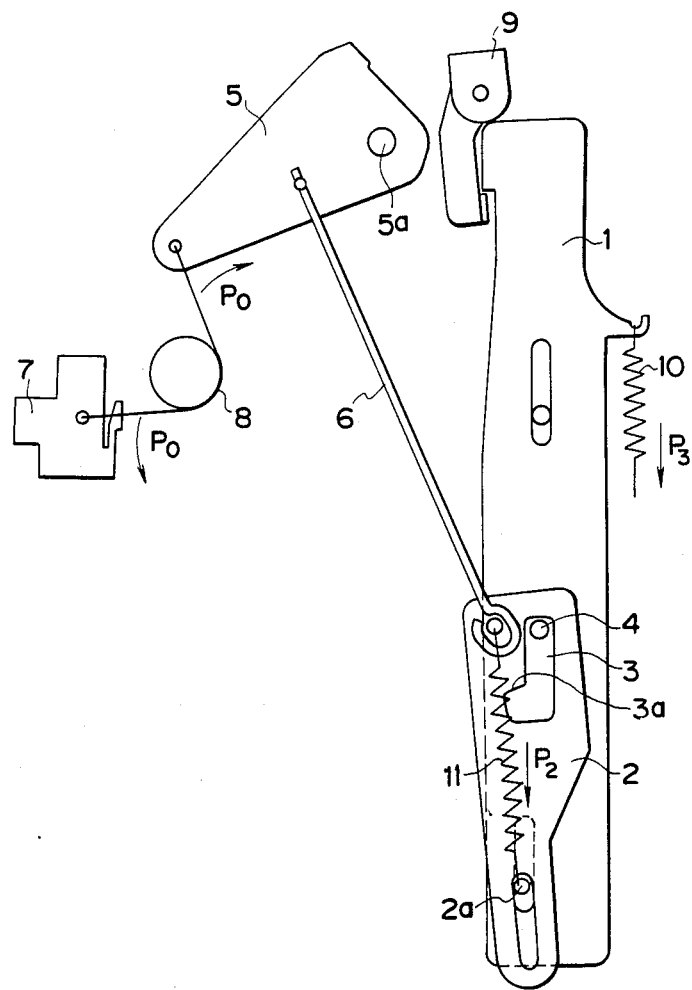

When a tape cassette is inserted in the configuration of FIG. 4, the lock member 9 is pushed by the cassette and unlocks the eject lever 1 to allow same to move forwardly with the revival energy P3 of the revival spring 10.

The pack stopper 7 moves rearwardly upon insertion of the cassette. When the pivotal point of the inversion spring 8 on the pack stopper 7 is moved rearwardly of the pivotal point on the guide arm 5, the energy of the inversion spring 8 is transmitted to the subsidiary plate 2 via the guide arm 5 and link 6 to bias the subsidiary plate 2. Therefore, the eject lever 1 is returned to its forward position. When the engage pin 4 of the eject lever 1 reaches the level of the engage portion 3a of the subsidiary plate 2, the plate 2 receives the clockwise moment M1 from the spring energy PO of the inversion spring 8 and rotates in the clockwise direction so as to accept the engage pin 4 in the engage portion 3a of the engage hole 3. As the result, the configuration of FIG. 1 is established again.

As described, since the guide arm returns to its forward position after ejection of a cassette independently from the eject lever which is locked at its rearward position, the eject lever can be located at its rearward position in the absence of a cassette and otherwise located at its forward position in the presence of a cassette in the tape player. Beside this, engagement between the eject lever 1 and subsidiary plate 2 is established or released by relationships between moments produced by the inversion spring 8, revival springs 10-11 and engaging configuration, etc. to reduce members or parts of the arrangement.

The invention is not restricted to the illustrated embodiment. For example, any artisan will realize that various modifications may be employed in place of the illustrated configurations of constituent members or parts and in place of the releasable engaging relationships between the eject lever and subsidiary plate within the scope of the invention. Additionally, the invention is not restricted to a tape player configured to commonly use the eject lever as an eject plate, and rather can be used in a tape player configured to use FF and REW levers as the eject lever.

Summarizing the description, since the invention arrangement can return the guide arm to its forward cassette suctioning position after ejection of a cassette, independently of the eject lever and eject plate which are maintained stationary at their rearward positions, the eject lever may be located at is forward position in presence of a cassette in the tape player and can be located at its rearward position in absence of a cassette so that the eject lever never gives an inconvenience upon cassette insertion or transport and display of the tape player. These advantages are obtained by a significantly simple construction where the subsidiary plate is provided reciprocally and pivotably with respect to the eject lever and connected to the guide arm.

The embodiments of the invention in which an exclusive property or privilege is claimed are defined as follows:

1. A tape pack ejecting arrangement in a tape player, comprising:
    an eject lever reciprocally movable between a forward position and an eject position, said eject lever moving in a first direction as it moves from said forward position to said eject position, and said eject lever having thereon an eject portion;
    a subsidiary plate having an engage means engagable with said eject portion of said eject lever, said subsidiary plate being supported for reciprocal movement approximately parallel to said first direction between first and second positions with respect to said eject lever and for pivotal movement with respect to said eject lever from said first position to a third position about an axis which is approximately normal to said first direction and which is spaced from said eject portion, wherein said subsidiary plate moves in said first direction as it moves from said first position to said second position, and wherein when said subsidiary plate is in said third and first positions said eject portion and said engage means are respectively engaged and spaced so as to respectively prevent and permit movement of said subsidiary plate in a second direction opposite said first direction relative to said eject lever;
    a pack stopper supported for reciprocal movement between first and second positions, wherein when a tape pack inserted in the tape player the tape pack engages said pack stopper and moves it from its first to its second position;
    a pivotable guide arm;
    a link member operatively coupling said subsidiary plate and said guide arm so that said guide arm pivots between first and second positions as said subsidiary plate moves between its first and second positions, respectively;
    an inversion spring which is interposed between and coupled to said pack stopper and said guide arm, wherein as said guide arm moves away from its first position when said pack stopper is in its second position said spring applies a first rotational moment to said guide arm which in turn applies through said link member to said subsidiary plate a rotational moment which urges said subsidiary plate toward its third position, and wherein when said guide arm has reached its second position said spring applies a second rotational moment opposite said first rotational moment to said guide arm which in turn applies through said link member to said subsidiary plate a rotational moment which urges said subsidiary plate toward its first position; and
    lock means for releasably locking said eject lever in said eject position during an ejecting operation and for releasing same upon insertion of a tape pack.

2. An ejecting arrangement according to claim 1, wherein said eject portion of the eject lever is an eject pin formed thereon, and said subsidiary plate has therein an engage hole which receives said engage pin therein, said engage hole having an L-shaped configuration which includes an engage portion extending approximately normal to said first direction and an elongated relief portion extending approximately parallel to said first direction, said engage portion of said engage hole having an edge which faces approximately in said second direction and which is said engage means.

3. An ejecting arrangement according to claim 2, wherein said edge of said engage hole is inclined with respect to said second direction, and including resilient means yieldably urging said subsidiary plate in said second direction relative to said eject lever.

4. An ejecting arrangement according to claim 1, wherein said lock means includes a lock member supported for movement between positions engaging and spaced from said eject lever.

* * * * *